Sept. 3, 1968

D. R. HONEYCUTT 3,399,786

ROD EYE ASSEMBLY

Filed Sept. 19, 1966

Don R. Honeycutt
INVENTOR.

BY
ATTORNEYS

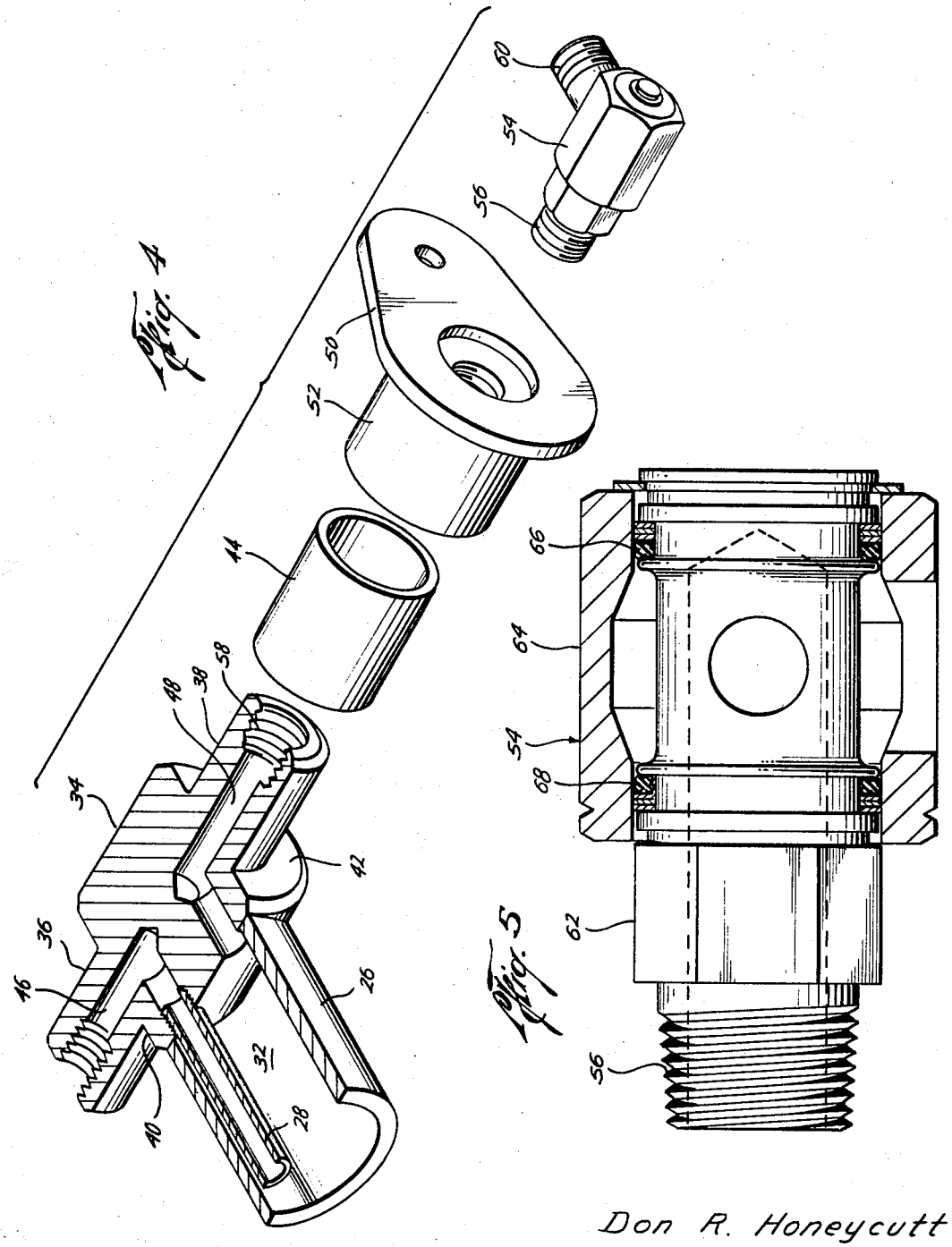

United States Patent Office 3,399,786
Patented Sept. 3, 1968

3,399,786
ROD EYE ASSEMBLY
Don R. Honeycutt, Bryan, Tex., assignor to Albritton Engineering Corporation, Bryan, Tex., a corporation of Texas
Filed Sept. 19, 1966, Ser. No. 580,270
2 Claims. (Cl. 212—58)

ABSTRACT OF THE DISCLOSURE

A rod eye assembly for use in a hydraulic crane unit which includes first and second circular ends having a cross section smaller than in the rod eye body with circular bearings provided around each circular end which are adapted to be supported by the crane whereby the rod eye body is rotatably supported, and a fluid passageway in each body end communicating with a double acting hydraulic piston for actuation of the unit and a fluid swivel connector connected to each end of the body thereby eliminating the necessity of seals internally of the rod eye assembly and eliminating flexure and fatigue of hydraulic connecting lines.

---

The present invention relates to an improvement in the rod eye assembly in a hydraulic crane, and more particularly relates to an improvement in the rod eye assembly in a crane having a double acting hydraulic piston and cylinder assembly in which hydraulic fluid is supplied to both sides of the piston through the piston rod and in which the rod eye assembly includes a minimum of moving parts and seals.

Generally, it is old to provide a hydraulic crane which has double acting hydraulic piston and cylinder units for operating either the crane boom or the outriggers which provide lateral support to the crane in which one end of the hydraulic system and cylinder units are supported for rotatable movement around a rod eye assembly through which the hydraulic lines for actuating the assembly is passed. However, the prior devices were generally complicated requiring extensive and expensive machining and required a multiplicity of seals for sealing off the hydraulic flow lines through the rotatable assembly.

Therefore, it is the general object of the present invention to provide a rod eye assembly in a hydraulic crane having a minimum of parts and seals to provide an assembly which does not require complicated and expensive machining and which is easily accessible for maintenance.

Still a further object of the present invention is the improvement in a rod eye assembly in a crane having a double acting piston and cylinder unit in which the hydraulic fluid is supplied to both sides of the piston through the piston rod and in which the rod eye body is secured to the end of the piston rod exteriorly of the cylinder and is provided with first and second circular ends which have a cross-sectional area smaller than the body and in which separate fluid passageways are provided in each end of the body communicating internally of the piston rods for actuation of the piston and cylinder units and a bearing is provided about each circular end adapted to be supported by the crane whereby the rod eye body is rotatable, and a fluid swivel connector is connected to each end of the body and in communication with each passageway for providing a swiveling fluid connection to the rotatable rod eye body.

Still a further object of the present invention is the improvement in a rod eye assembly in a hydraulic crane wherein the rod eye body includes first and second circular ends which have a cross-section smaller than the body on which the body is rotatably supported, and a circular bearing is provided around each circular end and in which support means are provided for supporting the bearing and thus the assembly, and for holding the bearing in place on the ends and a hydraulic passageway is provided extending from each end of the circular ends to the interior of the body thereby eliminating the necessity for seals internally of the rod eye assembly.

Figure 1:
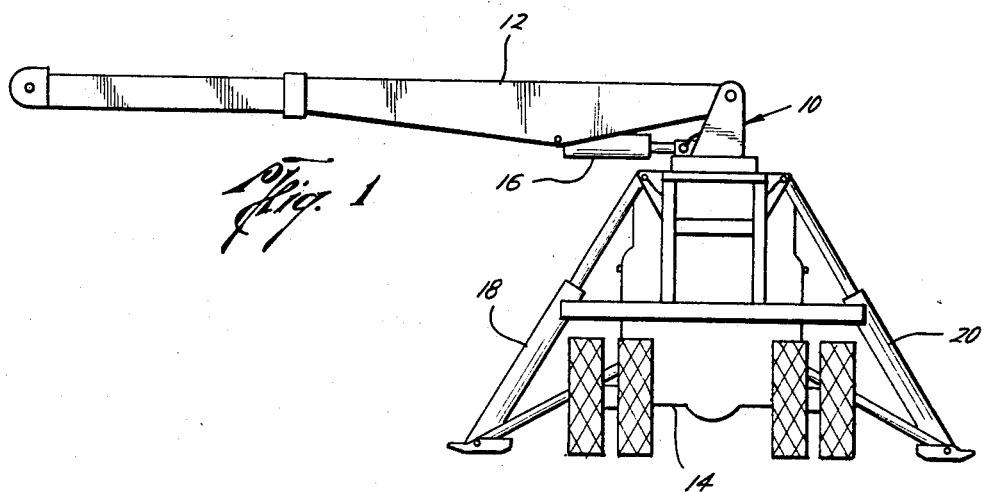
Figure 2:
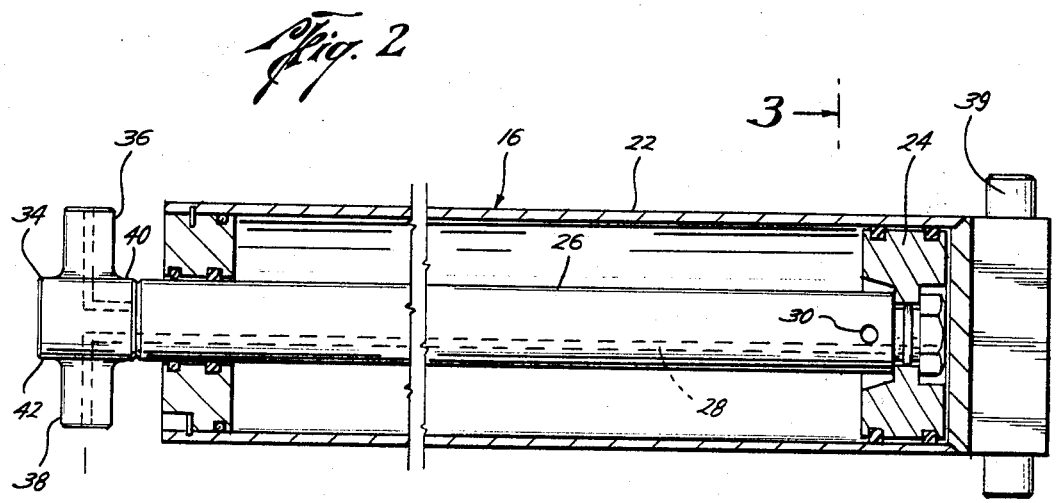
Figure 3:
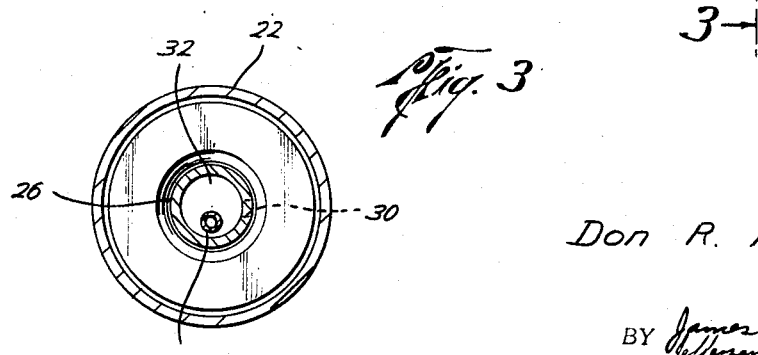

Other and further objects, features and advantages will be apparent from the following description of a presently preferred embodiment of the invention, taken in conjunction with the accompanying drawings, where like character references refer to like parts throughout the several views, and where, FIGURE 1 is an elevational view of a hydraulic crane including the improved rod eye assembly of the present invention, FIGURE 2 is an enlarged cross-sectional view of the rod eye connected to a piston and cylinder unit used in the hydraulic crane, FIGURE 3 is a cross-sectional view, taken along the line 3—3 of FIGURE 2, FIGURE 4 is an exploded perspective view, partly in cross-section, of part of the rod eye assembly of the present invention, and FIGURE 5 is an enlarged cross-sectional view of the fluid swivel connector.

Referring now to the drawings, and particularly to FIGURE 1, a hydraulic crane is generally indicated by the reference numeral 10 such as one having a boom 12 suitably mounted on a support such as a truck 14. Generally, the crane 10 is hydraulically actuated by the use of a plurality of double acting piston cylinder units such as the unit 16 for raising and lowering the boom 12, and the units 18 and 20 which act as outrigger supports for providing lateral and vertical support to the crane 10. As is conventional, the hydraulic units 16, 18 and 20 are pivotally connected at each end to allow rotative movement at the pivot connections when the units are actuated so as to be extended and retracted. Conventional units utilize external flexible hoses connected to opposite ends of the cylinder which are subjected to wear and accidental disconnection.

Referring now to FIGURES 2 and 3, one of the swivel acting hydraulic piston and cylinder units, for example 16, is shown which includes an enclosed cylinder 22, a movable piston 24 therein, a piston rod 26 extending outside of the cylinder 22, a fluid line 28 within the piston rod 26 and extending through the cylinder 22 providing hydraulic fluid to and from one side of the piston 24, a hollow interior passage 32 in the piston rod and in communication with a port 30 in the piston rod 26 to provide hydraulic fluid to and from the second side of the piston 24. Pivot pin 39 is provided at the first end of the piston and cylinder units for support from the crane and for allowing rotative movement of the first end of the piston and cylinder units.

The present invention is directed to the improvement in a rod eye assembly which allows rotative movement of the second end of the piston unit and through which hydraulic passageways may be provided for supplying hydraulic fluid to and from the opposite sides of the piston 24 with a minimum of seals. As best seen in FIGURE 2, the rod eye body 34 is sealingly secured to the piston rod 26 exteriorly of the cylinder 22 such as by welding. The body 34 includes first and second circular ends 36 and 38 of a reduced cross-sectional area compared to the body 34 thereby providing abutting stop shoulders 40 and 42, respectively adjacent the ends 36 and 38 respectively. Therefore, as best seen in FIGURE 4, a tubular bearing 44 is provided around each of the circular ends 36 and 38 and abutting the stop shoulders 40 and 42.

Fluid passageways 46 and 48 are provided in each end 36 and 38, respectively, one of which is connected to the line 28 for supplying hydraulic fluid to and from one side of the piston 24 and the other of which is connected to the hollow interior passage 32 of the piston rod 26 for supplying hydraulic fluid from and to the second side of the piston 24.

A support member 50 which includes a tubular portion 52 is provided for each end 36 and 38 in which the tubular portion 52 fits around and supports the bearings 44. The tubular support member 50 is in turn fixedly secured to the crane 10 for support and also longitudinally holds the bearings 44 in place.

In order to supply hydraulic fluid to and from the passageways 46 and 48 without flexure and fatigue of hydraulic lines, a swivel connector 54 is provided connected to each end 36 and 38. The swivel 54 includes one connector such as threads 56 for connection to thread 58 on each end and a fluid connection 60 which is in turn connected to a hydraulic line (not shown). As best seen in FIGURE 5, the fluid connector 54 is a conventional swivel connector in which the body 62 which is connected to the threadable connection 56 is rotatably movable with reference to the housing 64 which includes the second fluid connection 60. Connector 54 includes suitable seals 64 between body 62 and housing 64 for preventing fluid leakage.

In operation, hydraulic lines are connected to the connection 60 of the fluid swivel 54 and hydraulic fluid controlled by suitable and conventional hydraulic control mechanism which forms no part of the present invention, is supplied to and returned from each end 36 and 38 of the rod eye assembly body 34 for providing hydraulic fluid to and from opposite sides of the piston 24 for actuating the hydraulic piston and cylinder unit into an extended and retracted position. Thus the rod eye assembly provides a unit which is rotatably supported by the bearings 44 and support 50 for rotatable movement which is simple, requires a minimum of expensive machining and the only component which includes a sealing ring, the swivel connection 54, is easily accessible for repair and maintenance.

The present invention, therefore is well suited and adapted to attain the objects and the ends mentioned as well as those inherent therein. While a presently preferred embodiment of the invention is given for the purpose of disclosure, numerous changes in the details of construction and arrangement of parts may be made which will readily suggest themselves to those skilled in the art and which are eincompassed within the spirit of the invention and the scope of the appended claims.

What is claimed is:

1. In a crane having a double acting hydraulic piston and cylinder unit in which the hydraulic fluid is supplied to both sides of the piston through the piston rod, the improvement in the rod eye assembly comprising:

a rod eye body having first and second circular ends secured to the end of the piston rod exteriorly of the cylinder, said ends having a connection smaller than said body, a fluid passageway in each end of said body communicating internally of said piston rod for actuation of said unit, a bearing around each circular end adapted to be supported by the crane whereby the rod eye body is rotatable, a fluid swivel connector connected to each end of said body and in communication with each passageway for providing a swiveling fluid connection to the rotatable rod eye body.

2. In a crane having a double acting hydraulic piston and cylinder unit for raising and lowering the crane in which the cylinder is pivotally connected to the crane boom and in which hydraulic fluid is supplied to both sides of the piston through the piston rod, the improvement in the rod eye assembly comprising:

a rod eye body sealing secured to the end of the piston rod exteriorly of the cylinder and remote from the pivot connection of the cylinder to the crane, said body having first and second circular ends having a cross-section smaller than said body on which the body is rotatably supported, a separate fluid passageway extending through each end communicating internally of said piston rod for actuation of said unit, a circular bearing around each circular end whereby the rod body is rotatable, tubular support means adapted to be supported from the crane for supporting said bearings and for holding them in place on said ends, a fluid swivel connection connected to each end of said body and in communication with each passageway for providing a swiveling fluid connection to the rotatable eye body.

References Cited

UNITED STATES PATENTS

| | | | |
|---|---|---|---|
| 2,577,462 | 12/1951 | Hackney | 92—111 X |
| 2,790,426 | 4/1957 | Mueller | 92—119 |
| 2,917,277 | 12/1959 | Pine | 92—119 X |
| 3,056,510 | 10/1962 | Garnett | 212—59 |
| 3,152,522 | 10/1964 | Burden et al. | 92—119 X |
| 3,210,099 | 10/1965 | Franck | 285—190 |

FOREIGN PATENTS 635,176 11/1963 Belgium.
518,307 12/1920 France.

EDGAR W. GEOHEGAN, *Primary Examiner.*

I. C. COHEN, *Assistant Examiner.*